United States Patent

Rauschelbach

[15] 3,688,175
[45] Aug. 29, 1972

[54] AUTOPILOT PITCH ATTITUDE CONTROL

[72] Inventor: Paul A. Rauschelbach, Phoenix, Ariz.

[73] Assignee: Sperry Rand Corporation

[22] Filed: Aug. 7, 1970

[21] Appl. No.: 61,964

[52] U.S. Cl. .....................318/580, 244/77, 318/584
[51] Int. Cl. ...............................................B64c 13/16
[58] Field of Search......318/580, 584, 628, 565, 562; 244/77

[56] References Cited

UNITED STATES PATENTS 2,649,563  8/1953  Meredith....................318/565
3,116,899  1/1964  Jude et al. ...................244/77
3,521,839  7/1970  Diani......................318/628 X Primary Examiner—Benjamin Dobeck
Attorney—S. C. Yeaton

[57] ABSTRACT

A manually operated pitch wheel, not requiring any centering, synchronizing, or detents, is used to adjust the pitch attitude of an aircraft, which is flying under control of the pitch attitude mode of an automatic flight control system. This pitch wheel may also be used to adjust the aircraft vertical speed while it is flying in the vertical speed mode of an automatic flight control system.

10 Claims, 2 Drawing Figures

INVENTOR
PAUL A. RAUSCHELBACH
ATTORNEY

AUTOPILOT PITCH ATTITUDE CONTROL

BACKGROUND OF THE INVENTION

1. Field of the Invention

This invention relates to a system for introducing a manual command signal into a command integrator in an automatic control system for proportionally changing the output signal level reference of the integrator.

2. Description of the Prior Art

The invention has particular application in the pitch and vertical speed control mode of an automatic flight control system. Previously, the pitch wheel output was introduced to the pitch attitude control mode by a complex mechanization, including centering devices, synchronizing devices, etc. Prior to engagement, synchronization between the pitch wheel and the existing commanded pitch attitude was mandatory, or the pitch wheel had to be centered to give a zero command. If either of these conditions were not satisfied, aircraft pitch attitude transients at the time of engagement could be severe. Additionally, if synchronization of the command pitch wheel or knob were effected prior to engagement, the pitch wheel might be too far off its normal center position to provide adequate manual pitch control in both directions.

SUMMARY OF THE INVENTION

The invention teaches a method for manually adjusting the pitch attitude of an aircraft through the automatic flight control system while in the pitch attitude mode. A manually operated pitch wheel is mechanically connected to a rate generator having an output signal proportional to the rate of rotary displacement of the pitch wheel. The generated signal is filtered and sensed by a level detector. The level detector unclamps the pitch integrator and thereby allows the signal to be integrated. The change in signal level reference creates a pitch attitude error signal which will drive the pitch control surfaces through a servomechanism system. On cessation of pitch wheel motion, the generated signal reduces to zero and the pitch integrator is again clamped and will hold the adjusted signal level reference and hence the commanded aircraft pitch attitude.

The invention may also be used as a manually operated vertical speed command wheel. When the autopilot is in the vertical speed mode, the pitch wheel generated signal, if not inhibited by the level detector, adjusts the signal level reference stored in the vertical speed integrator, and hence adjusts the aircraft vertical speed.

A primary object of the invention is to eliminate the need for synchronization of a manual pitch control system.

Another object of the invention is to eliminate the requirement for mechanical recentering of the manual pitch control system.

Another object of the invention is to prevent pitch attitude transients at engagement of the manual pitch control.

Another object of the invention is to provide a manual pitch control that has no output unless the pitch wheel is rotating.

Another object of the invention is to provide a means for manually adjusting either the pitch attitude command or the vertical speed command, dependent upon which mode is engaged.

Another object of the invention is to provide a single, manual means for adjusting either the pitch attitude command or the vertical speed command.

DESCRIPTION OF THE PREFERRED EMBODIMENT

Figure 1:
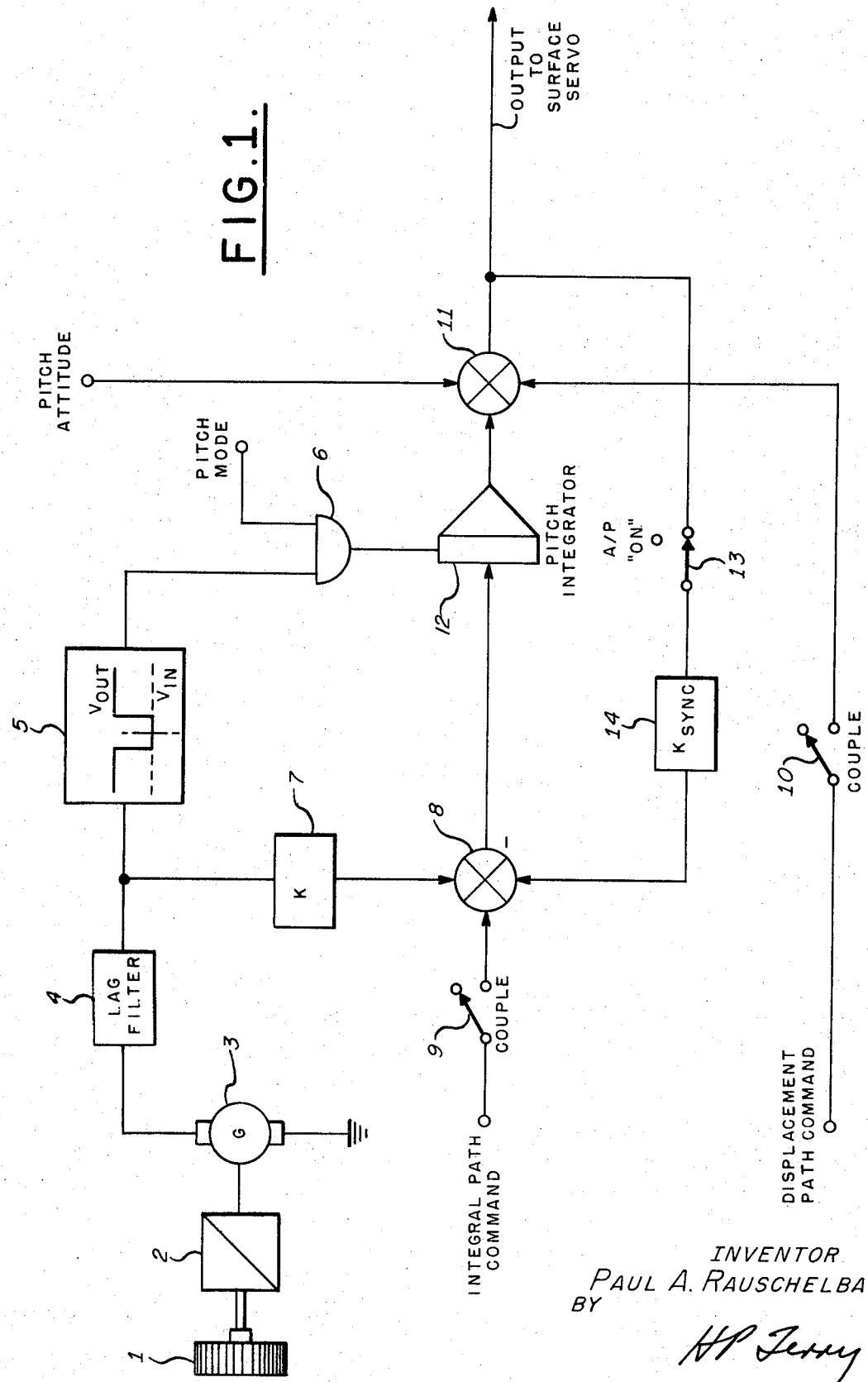
FIG. 1 illustrates a preferred embodiment of the apparatus of the present invention in the pitch attitude hold of operation.

In addition to the invention, FIG. 1 also illustrates the applicable portion of the pitch channel of a typical automatic flight control system. A detailed description of such system may be found in U.S. Pat. No. 3,116,899, entitled "Aircraft Automatic Pilot" and assigned to the present assignee. In summary, the pitch channel of the automatic flight control system or automatic pilot, operates as follows. A pitch command error signal or vertical path command error signal, which may be provided by an air data system, a receiver, a vertical speed command unit, associated with said air data system, or vertical path determining signal source, is supplied on the lines marked "Integral Path Command" and "Displacement Path Command". In a vertical path mode of the autopilot, switches 9 and 10 are closed and the command signal appears at summing junctions 8 and 11, respectively. The output of summing junction 8 is integrated by integrator 12 and becomes the long term error signal equivalent, sometimes referred to as forward path integral control. The output of the integrator 12 appears at summing junction 11. A third input to summing junction 11 is labelled "Pitch Attitude" and represents the actual pitch attitude of the aircraft, such as supplied by a vertical gyroscope. The output of summing junction 11 represents a control signal for positioning the aircraft pitch control surfaces through appropriate and conventional amplifiers and servomechanisms (not shown).

The integrator 12 has a feedback loop which is in effect during nonengagement of the autopilot, that is, during manual control of the aircraft. The purpose of this feedback loop is that of keeping the integrator 12 synchronized with the pitch attitude of the aircraft and thereby prevent unwanted transients upon engagement of the autopilot. The synchronization is obtained by closing switch 13 so that the output of summing junction 11, after being suitably gain controlled by unit 14, is fed to integrator 12, through summing junction 8. The output of the integrator 12 will increase, or decrease, at a rate dependent upon its time constant, until it equals the pitch attitude input to the summing junction 11. The summing junction 11 signal output will therefore remain essentially at zero. Any subsequent change in the pitch attitude signal will again be reflected at the summing junction 11 output and again will be synchronized out to obtain a zero signal at the summing junction 11 output. The existence of an error signal at the output of summing junction 11 will simultaneously actuate the servomechanisms and maintain them in synchronism with the control surfaces, though disconnected therefrom.

The pitch channel of an automatic flight control system usually has a pitch attitude hold mode which includes means for permitting the pilot to manually adjust or modify the pitch attitude of the aircraft as he desires. The instant invention describes such a manual means which does not have the previously described drawbacks of existing manual systems and is illustrated in FIG. 1.

Prior to engagement of the autopilot, the system may have been in either a manual (pitch attitude hold) or a vertical path configuration. If it were in the manual configuration with the autopilot energized but not engaged, switches 9 and 10 would have been open and switch 13 closed. In this mode no flight path command signals appear at leads labelled Integral Path Command and Displacement Path Command. Closing switch 13 engages the Pitch Synchronizer and synchronizes the control surface servoes with the pitch attitude signals. As the autopilot is not engaged, the servoes are disconnected from the control surfaces. On engagement of the autopilot, switch 13 is opened and the pitch attitude reference, then existing in the integrator 12, would be maintained. If the autopilot were engaged in a vertical path mode, switches 9 and 10 would be closed, and any input from a flight path command source would likewise be synchronized.

Most modern autopilots generally have two basic modes. One, the path mode wherein the aircraft is controlled to fly along a pre-established path, such as altitude hold, vertical speed, glide slope, etc. The second is the manual or pitch attitude hold mode wherein the aircraft is controlled to fly at or maintain a particular attitude. In this mode, the pitch attitude is adjustable. On engagement of the pitch attitude hold, referred to as the pitch hold mode, switches 9 and 10 would be opened and no further command signals from the air data computer or other path source would be received by integrator 12. The pitch attitude reference then present at the integrator 12 would be maintained as switch 13 would remain open. Also, in this mode the integrator will be clamped so "noise" signals will not disturb it. In operation, the aircraft will maintain the pitch attitude then present.

Referring to FIG. 1, the pitch wheel 1 may be a thumb operated wheel suitably positioned in the aircraft cockpit and is mechanically connected to a conventional rate generator 3 through a step-up gear train 2. The rate generator 3 may be a suitable a.c. or d.c. tachometer. The output signal of the rate generator 3 is filtered by filter 4 to remove ripple or other noise. A level detector 5 senses the filtered signal, and if it is above a predetermined threshold level, the signal will appear as one input at AND gate 6. The output of the filter 4 is simultaneously matched to the existing automatic flight control circuits in unit 7 and the final rate signal appears as an input at summing junction 8.

Through conventional autopilot interlock circuits, selection of the pitch mode causes a signal to be present at AND gate 6 and provides the second input to the gate 6. Actuation of gate 6 will unclamp integrator 12 and thereby enable it. Simultaneously, the rate signal appearing at summing junction 8 will be introduced into the integrator 12 and will be integrated to thereby provide a pitch attitude displacement command. An imbalance will now occur at summing junction 11 and an error signal will be present to proportionally drive the pitch control surface servomechanisms. The pitch control surfaces will then move causing a change in pitch attitude of the aircraft. The change in pitch attitude will be reflected at the vertical gyroscope and it will provide an input to the summing junction 11. In due time, depending on the response and damping characteristics of the servo system, the new or commanded pitch attitude and the altered reference level of the integrator will balance and produce a null at the output of summing junction 11 and a quiescent or steady state condition is again reached. The actual pitch attitude of the aircraft will be that commanded by the pitch wheel 1.

As can be recognized from the above description, the pitch wheel presents no output except while it is moved. Thus, it need not be synchronized to the autopilot during pitch modes as was necessary with prior art manual pitch wheel systems. Also, there is no need for mechanical detents, centering springs, and the like.

Figure 2:
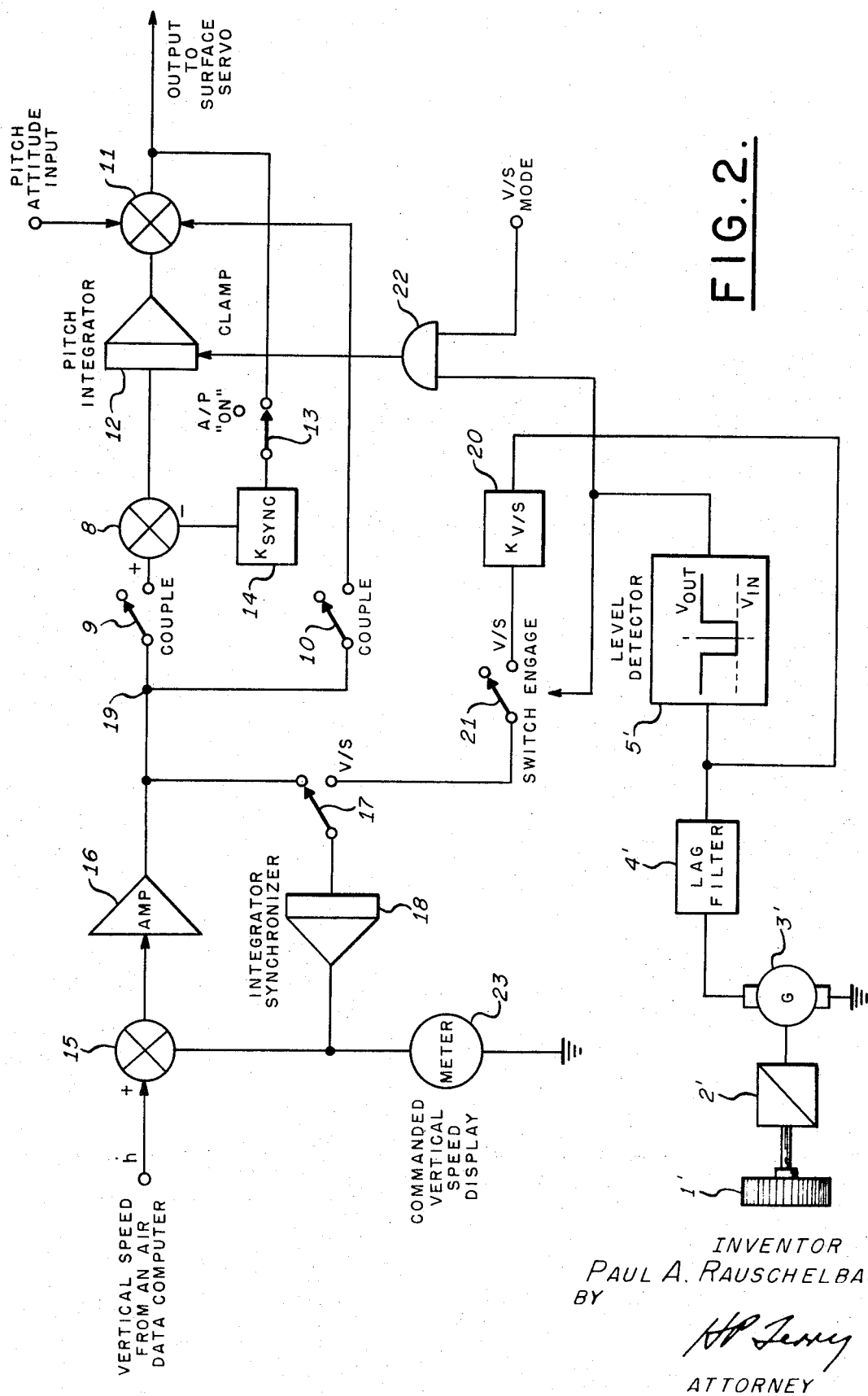
FIG. 2 illustrates a preferred embodiment of the apparatus of the present invention in the vertical speed command mode of operation.

The invention may also be used to provide a manually commanded change in the autopilot vertical speed flight path mode. FIG. 2 illustrates the previously described pitch synchronizer having as its commanded input signal for both the integral and displacement paths, a vertical speed signal, and the circuit necessary to incorporate the invention. Prior to engagement of the vertical speed mode, an electronic synchronizer loop comprising the summing junction 15, amplifier 16, switch 17, and integrator/synchronizer 18, maintains the vertical speed command at point 19 zero in a manner similar to that described above. On engagement of the vertical speed command mode, switch 17 is opened, and the integrator 18 maintains the vertical speed command signal level present at the time of engagement. Simultaneously, the switches 9 and 10 are closed, switch 13 is opened, and the vertical speed mode of the autopilot will maintain the aircraft at the vertical speed existing at the time of engagement.

At that instant, the signal level at point 19 is zero and hence no signal appears at the input to integrator 12 or summing junction 11. As the output signal level of integrator 12 matches the pitch attitude input to summing junction 11, the summing junction 11 output was zero and servomechanism system was in a quiescent state resulting in a vertical flight speed present before engagement of the vertical speed mode. By means of the instant invention, the vertical speed may be manually increased or decreased by the pilot.

A vertical speed wheel 1' driving a rate generator 3' through a step-up gear train 2' may be used to produce a signal representative of a desired change in the commanded and existing vertical speed. A filter 4' removes ripple and other noise present in the signal and a level detector 5' will inhibit a signal of less than a desired threshold level. If desired, elements 1' through 5' may be the same elements as elements 1 through 5 previously described and may be connected as shown by appropriate switching means (not shown). The output of filter 4' is matched to the system by unit 20 and connected to one side of switch 21 marked V/S. An output of the level detector 5' actuates switch 21. A second output of filter 4' is now connected to integrator 18 through switches 21 and 17 and integrator 18 integrates the rate signal from generator 3' to thereby provide a displacement command to the vertical speed system. The output of integrator 18 is thus adjusted and an imbalance will occur at the output of summing junction 15 representing an error signal.

A second output of the level detector 5' is applied as one input to AND gate 22. The second input to AND gate 22 is obtained from actuation of the vertical speed (V/S) mode switch (not shown). The presence of these two inputs will clamp integrator 12.

The error signal present at summing point 15 is introduced to summing point 11 by switch 10 through a short term displacement path. An immediate imbalance will occur at summing point 11 causing an output and the servomechanism will be activated resulting in a change in aircraft pitch attitude. The clamping of the integrator 12 inhibits the signal level reference from being modified in proportion to the signal generated by the pitch wheel 1'. Thus, the pitch wheel 1' movement will cause an immediate change in aircraft attitude by the signal present on the displacement path. The pitch attitude of the aircraft will now begin to change causing a change in the pitch attitude input from the vertical gyroscope to summing junction 11 and decreasing the error signal seen by the servomechanism system. In due time the system will stabilize at a new aircraft vertical speed.

When the pitch wheel is again stationary, switch 21 will disengage and integrator 18 will stabilize at its new level. As the aircraft begins to assume its new pitch attitude, and hence vertical speed, the input to summing junction 15 from the air data computer will change until the summing junction output, or error signal, reduces to zero. The cessation of signal output from the pitch wheel 1' will inhibit an output from AND gate 22 and integrator 12 will unclamp. Thereby, long term vertical speed error signals emanating from the air data computer due to fuel depletion, shift in load, etc., will cause an imbalance at summing junction 15 resulting in an error signal output. This error signal will modify the reference level in integrator 12 and cause movement of the pitch control surfaces through the servomechanism system. A change in the pitch control surfaces will cause a change in the pitch attitude of the aircraft and the vertical gyroscope will provide an input to the summing junction 11 until the system is once more stabilized.

A meter 23 may be connected to the output of integrator 18 to present a visual indication of the change in vertical speed commanded by the pitch wheel.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. In an automatic pilot system for aircraft, the combination comprising an integrator output signal level adjustment subsystem comprising
    integrator means, manually rotatable rate generator means for providing an output signal proportional to the rate of rotation thereof, means for operably connecting said rate generator means output signal with said integrator means, means for detecting said output from said rate generator means, and means responsive to said detecting means for enabling said integrator means whereby its output signal level is adjusted in accordance with said rate generator means output signal,
    wherein said rate generator means comprises a manually rotatable rate generator, a noncentering manually operated wheel and a step-up gear train operably connecting said wheel with said rate generator,
    wherein said detecting means comprises a threshold detector having a pre-established minimum level,
    wherein said integrator means comprises clampable integrator means,
    wherein said detecting means comprises switching means responsive to said threshold detector for operably connecting said integrator with said rate generator whereby the rate generator output signal will adjust the integrator output signal level.

2. In an aircraft automatic flight control system having a pitch attitude command mode including a source of pitch attitude command input signals, a clampable pitch integrator for integrating when unclamped the pitch attitude command input signals and when clamped for maintaining a fixed pitch attitude, a source of pitch attitude input signals, a first summing junction for combining the pitch attitude command input signals and pitch attitude signals, and a servomechanism system for positioning the aircraft pitch surfaces in accordance with the output signal of the first summing junction, wherein the improvement comprises
    manually operable rate generator means for providing a signal in response to the speed of rotation thereof, and
    means for unclamping the pitch integrator in response to an output of said rate generator means, whereby an output from said rate generator means will modify the original level stored within the pitch integrator and thereby affect the output of the first summing junction.

3. The system as claimed in claim 2 wherein said unclamping means comprises a level detector for inhibiting an output of said rate generator means less than a predetermined value.

4. In an aircraft automatic flight control system having a pitch attitude command mode including a source of pitch attitude command input signals, a clampable pitch integrator for integrating when unclamped the pitch attitude command input signals and when clamped for maintaining a fixed pitch attitude, a source of pitch attitude input signals, a first summing junction for combining the pitch attitude command input signals and pitch attitude signals, and a servomechanism system for positioning the aircraft pitch surfaces in accordance with the output signal of the first summing junction, wherein the improvement comprises
    manually operable rate generator means for proving a signal in response to the speed of rotation thereof, and
    means for unclamping the pitch integrator in response to an output of said generator means, whereby an output from said rate generator means will modify the original level stored within the pitch integrator and thereby affect the output of the first summing junction, wherein said unclamping means comprises a level detector for inhibiting an output of said generator means less than a predetermined value and an AND gate responsive to an output from said level detector and an output from a pitch attitude mode selector switch for providing an input to the pitch integrator, whereby said input to the pitch integrator unclamps the pitch integrator.

5. The system as claimed in claim 4 wherein said signal rate generator comprises a manually operated wheel, and a gear train for operably connecting said wheel with said rate generator.

6. The system as claimed in claim 5 comprising a filter for filtering the output of said rate generator.

7. In an aircraft automatic flight control system having a vertical speed command mode, the combination comprising a source for the vertical speed command signal, a vertical speed integrator, a clampable pitch integrator, a pitch attitude input signal source, a summing junction for combining the vertical speed command signal, the vertical speed integrator output, the pitch integrator output and the pitch attitude input signal, a servomechanism system for positioning the pitch control surfaces in response to the output signal of the summing junction, wherein the improvement comprises manually operated signal rate generator, means for adjusting the vertical speed integrator output signal level in accordance with the output of said rate generator, means for clamping the pitch integrator in response to an output from said rate generator means, whereby movement of said rate generator means will change the output signal level of the summing junction and energize the servomechanism system until the output signal level change is compensated by the pitch attitude input signal.

8. The combination as claimed in claim 7 wherein said adjusting means comprises a level detector for inhibiting a signal output of said rate generator means of less than a predetermined value, and means for operably connecting said rate generator means to said vertical speed integrator.

9. In an aircraft automatic flight control system having a vertical speed command mode, the combination comprising a source for the vertical speed command signal, a vertical speed integrator, a clampable pitch integrator, a pitch attitude input signal source, a summing junction for combining the vertical speed command signal, the vertical speed integrator output, the pitch integrator output and the pitch attitude input signal, a servomechanism system for positioning the pitch control surfaces in response to the output signal of the summing junction, wherein the improvement comprises manually operated signal rate generator means, means for adjusting the vertical speed integrator output signal level in accordance with the output of said rate generator means, means for clamping the pitch integrator in response to an output from said rate generator means, whereby movement of said rate generator means will change the output signal level of the summing junction and energize the servomechanism system until the output signal level change is compensated by the pitch attitude input signal,
 wherein said adjusting means comprises a level detector for inhibiting a signal output of said rate generator means of less than a predetermined value, and means for operably connecting said rate generator means to said vertical speed integrator,
 wherein said clamping means comprises an output signal from said level detector, an AND gate having one input responsive to said rate generator means, said AND gate having a second input responsive to a vertical speed mode switch, means associated with the pitch integrator responsive to an output from said AND gate output for clamping the pitch integrator.

10. The combination as claimed in claim 9 including an automatically actuatable switch responsive to an output from said level detector whereby the signal level stored within said vertical speed integrator is modified by the output of said level detector.

* * * * *